United States Patent [19]

Chasseguet et al.

[11] Patent Number: 4,904,226

[45] Date of Patent: * Feb. 27, 1990

[54] TORSION-DAMPING DEVICE FOR A TORQUE TRANSMISSION SYSTEM

[75] Inventors: Gustave Chasseguet, Taverny, France; John Willyard, Farmington Hills, Mich.; Dominique Despres, Clichy, France

[73] Assignee: Valeo, Paris, France

[*] Notice: The portion of the term of this patent subsequent to Apr. 11, 2006 has been disclaimed.

[21] Appl. No.: 86,889

[22] Filed: Aug. 19, 1987

[30] Foreign Application Priority Data

Aug. 21, 1986 [FR] France ............................. 86 11935
Oct. 23, 1986 [FR] France ............................. 86 14727

[51] Int. Cl.$^4$ .......................... F16D 3/12; F16F 15/10
[52] U.S. Cl. ................................. 464/68; 74/574; 192/106.2
[58] Field of Search .............. 74/574; 192/106.2; 464/64, 66, 68

[56] References Cited

U.S. PATENT DOCUMENTS

| | | | |
|---|---|---|---|
| 4,351,167 | 9/1982 | Hanke et al. | 464/68 X |
| 4,351,168 | 9/1982 | Prince et al. | 464/64 |
| 4,537,579 | 8/1985 | Loizeau | 464/68 |

FOREIGN PATENT DOCUMENTS

| | | | |
|---|---|---|---|
| 0170950 | 2/1986 | European Pat. Off. | |
| 3315484 | 10/1984 | Fed. Rep. of Germany | 464/66 |
| 2571461 | 4/1985 | France | |
| 2583486 | 12/1986 | France | 192/106.2 |
| 200816 | 11/1984 | Japan | 192/106.2 |
| 2089472 | 6/1982 | United Kingdom | 464/68 |
| 2153489 | 8/1985 | United Kingdom | 464/68 |
| 2159241 | 11/1985 | United Kingdom | 464/64 |

Primary Examiner—Daniel P. Stodola
Attorney, Agent, or Firm—Charles E. Brown; Charles A. Brown

[57] ABSTRACT

Torsion-damping device, particularly in an inertia flywheel forms the reaction plate of a clutch. The damping device comprises two coaxial parts capable of limited rotation relative to each other against the action of springs mounted between pivoted pedestals. Elements of damping material are disposed near engagement zones between the pedestals and each of the coaxial parts.

22 Claims, 5 Drawing Sheets

TORSION-DAMPING DEVICE FOR A TORQUE TRANSMISSION SYSTEM

The invention relates to a torsion-damping device for a torque transmission system, such as a clutch; it is concerned more particularly with reducing the noise generated under certain circumstances, especially when the system momentarily begins to resonate.

A torque transmission system, such as a friction clutch, intended to be inserted between the crank shaft of the engine and the input shaft of the gearbox, in a motor vehicle, usually possesses a torsion-damping device capable of absorbing the variations in this torque, in order to prevent vibrations, and particularly sound vibrations, from arising over the entire length of the kinematic chain, in which the torsion-damping device is inserted. Such a damping device is often combined with the friction disc of the clutch or with the inertia flywheel which is driven by the engine crankshaft and also functions as a reaction plate for the clutch.

Thus, French Pat. No. 2,571,461 describes such a damping device combined with an inertia flywheel. The flywheel comprises two coaxial parts, between which are placed helical springs arranged circumferentially. More specifically, each spring is held between pedestals mounted in an articulated manner between two flanges (otherwise called guide washers) of a first part, the driving part in this particular case, whilst these same pedestals are capable of being stressed circumferentially, with a possibility of articulation, by annular sheet-metal webs fixed to the driven part, the variation in compression of the springs ensuring that torque variations are absorbed and some filtering of vibrations of all kinds.

This arrangement gives good results, mainly because of the presence of the articulated pedestals which allow the springs to function under better conditions, preventing them from being subjected to excessive radial deformations towards the inside or the outside. Moreover, such a system is designed so that the resonance peak is "below" the idling range of the engine. However, it was found that when the engine stops, that is to say just when the system is momentarily under its conditions of resonance once again, sound vibrations sometimes occur. Because of the large number of components capable of causing such a noise in the kinematic chain in general and in the clutch in particular, it was difficult to pinpoint such and such an element or group of elements. Of these, the seats initially seemed the least capable of causing this noise, because they are made of molded plastic which is a material usually considered to be only slightly "sound-generating". The invention mainly involved overcoming such a prejudice by showing that, under the transient conditions defined above, the pedestals are subjected to violent circumferential stress to the extent that, when they are periodically detached from their rotary bearing zones, the noise arises both from the impacts of one of the coaxial parts on the pedestals, when these have moved away from their bearing zones, and from the impacts of the said pedestals on the other part, when they resume their position. The invention makes it possible to eliminate such noises.

More specifically, the invention therefore relates to a torsion-damping device, especially in a clutch, of the type comprising two coaxial parts mounted with a possibility of limited rotation relative to one another, a first part comprising two substantially parallel annular flanges, and a second part comprising at least one web inserted axially between the two flanges, and springs arranged substantially circumferentially between pedestals mounted on one of the parts, each pedestal having first engagement means interacting with matching engagement means of one of the parts, in order to define between them at least one first rotary bearing zone, and second engagement means interacting with matching engagement means of the other part, in order to define between them at least one second rotary bearing zone, wherein at least one of the coaxial parts and/or the pedestals are equipped with or form elements made of a damping material, for example an elastomeric material, rubber or the like, which are interposed at least near the above mentioned engagement means, in order to damp the shocks between the pedestals and the coaxial parts.

Although the structure just described applies particularly to a torsion-damping device which at the same time forms an inertia flywheel, the same arrangement can be fitted in another element of the clutch, namely the friction disc.

Many embodiments are possible. Thus, the pedestals can be covered with a layer of elastomeric material. However, it is preferable to ensure that the said coaxial parts and the said pedestals which between them define the above-mentioned rotary bearing zones are not covered with absorbent material, to avoid disturbing the pivoting kinematics of the pedestals. Consequently, the invention is aimed particularly at embodiments which are such that the above-mentioned damping elements are located at a distance from the rotary bearing zones defined above.

Thus, the shocks are damped because each pedestal and the coaxial parts first come in contact via the damping material which is shaped and arranged in such a way that it can move aside in proportion as the components approach one another, contact in the region of the rotary bearing zones not covered being made less violently and without troublesome noise. However, the case of complete covering of the components in question (and especially the pedestals) with the damping material remains within the scope of the invention, if only because the damping material could be eliminated quickly and naturally on the rotary bearing zones at the start of the service life of the torsion damper.

Of all the solutions covered by the preceding definition, there is one particularly, in which above-mentioned elements made of damping material are carried by the flanges, and especially attached to these flanges, laterally, so as to interact with the rear faces of the pedestals. More specifically, in this case the flanges in question have elongate slots arranged circumferentially, two opposing slots made respectively in the two flanges containing an above-mentioned spring and on their substantially radial edges having rounded notches receiving journals defined laterally on the corresponding pedestal. In this arrangement, the elements of damping material are plates fastened to the inner faces of the flanges, so as to project circumferentially relative to the bottoms of the rounded notches.

This arrangement is satisfactory where noise suppression is concerned, especially when the engine stops and the system is momentarily under its conditions of resonance once again. However, whenever a pedestal is momentarily detached from the flanges on which it is normally articulated, there is a brief interval of time, during which the pedestal is now only stressed by the prestressing force of the spring associated with it. This occurs whenever the web is disengaged from the pedestal. It is therefore spring which performs the function of starting to deform the elements of damping material fastened along the flanges, before its action is reinforced by that of the web or webs coming in contact with the pedestal at the other end of the same spring. Now during the time when this movement takes place, the pedestals and the springs are stressed radially outwards as a result of the centrifugal force. If the circumferential stress attributable to the spring prestress alone is too low to cause sufficient deformation of the element of damping material, there can be a radial deviation of the path of the pedestal and consequently, in course of time, wearing of some parts of the journals and of the wall of the recess which opens out at the center of the rear face of the pedestal and in which the above-mentioned web or webs engage. Moreover, since it is not possible to reduce the "rigidity" of the damping material beyond certain limits without impairing the effectiveness of the system against noise, such localized wear phenomena can generate operating play which, in course of time, may be detrimental to the reliability of the torsion damper.

The invention also makes it possible to overcome this disadvantage.

In this spirit, the invention also relates to a torsion-damping device of the type described above, in which two flanges have circumferentially elongate slots, two opposing slots made respectively in the two flanges containing a spring mounted with initial prestress between two pedestals, each slot having, on its substantially radial edges, rounded notches receiving journals defined on the corresponding pedestals, wherein the elements of damping material and the zones of the rear face of each pedestal which are capable of coming in contact with one another are provided with cut-outs and reliefs interacting in order to stabilize the pedestal radially relative to the flanges during a relative circumferential movement between these.

The invention will be understood better and other advantages of it will emerge more clearly from the following description of a torsion-damping device conforming to its principle, this description being given purely by way of example and being made with reference to the accompanying drawings in which.

Referring to FIGS. 1 to 7, these illustrate more particularly an inertia flywheel forming a torsion damper 11 for a motor-vehicle transmission, this flywheel having an annular contact surface 12 designed to make it perform the additional function of a reaction plate in a friction clutch. In this respect, the flywheel 11 is intended to be fastened by means of its hub 13 to the crankshaft of the internal combustion engine of the motor vehicle. It comprises two coaxial parts 15 and 16 which will be respectively called the first and the second part below and which are mounted with the possibility of limited rotation relative to one another, in particular counter to the force exerted circumferentially between them by helical springs 18. The first part 15 or driving part, which includes the hub 13, comprises two annular metal flanges 19, 20 commonly called "guide washers". The flange 19 is fastened to the hub 13. The flange 20, parallel to the flange 19, is fastened on the outside of the latter, with a solid annular spacer 22 carrying the starting ring being interposed. These flanges have in the conventional way elongate slots 23 extending circumferentially. Each slot in a flange is opposite a symmetrical slot in the other flange, so as to define receptacles intended for containing the springs 18. Each spring 18 is mounted in such a receptacle by means of two end pedestals 24. Each pedestal 24 has first engagement means interacting with matching engagement means of the flanges 19 and 20, to define between them at least a first rotary bearing zone. In the example described, each pedestal has two lateral journals 25 forming a common axle parallel to the axis of rotation of the damping flywheel, whilst the slots 23 have, on their substantially radial edges, rounded notches 26 receiving the journals 25 of the corresponding pedestal. Thus, for each pedestal, the interaction of the journal 25 and the notches 26 defines two first lateral rotary bearing zones, as indicated above. Also in practice, the center of each end of the spring 18 is positioned nearer to the axis of rotation than the center of rotation of the convex part 25 forming a journal.

Figure 1:
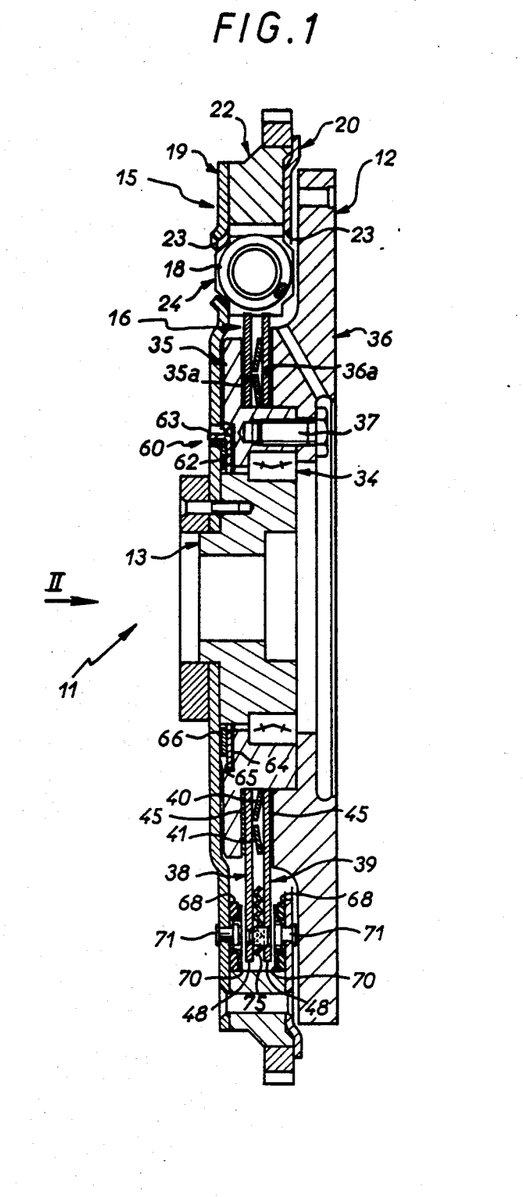
FIG. 1 is a general view of a torsion-damping device forming an inertia flywheel, incorporating the improvements of the invention and illustrated along the sectional line I-I of FIG. 2.
Figure 2:
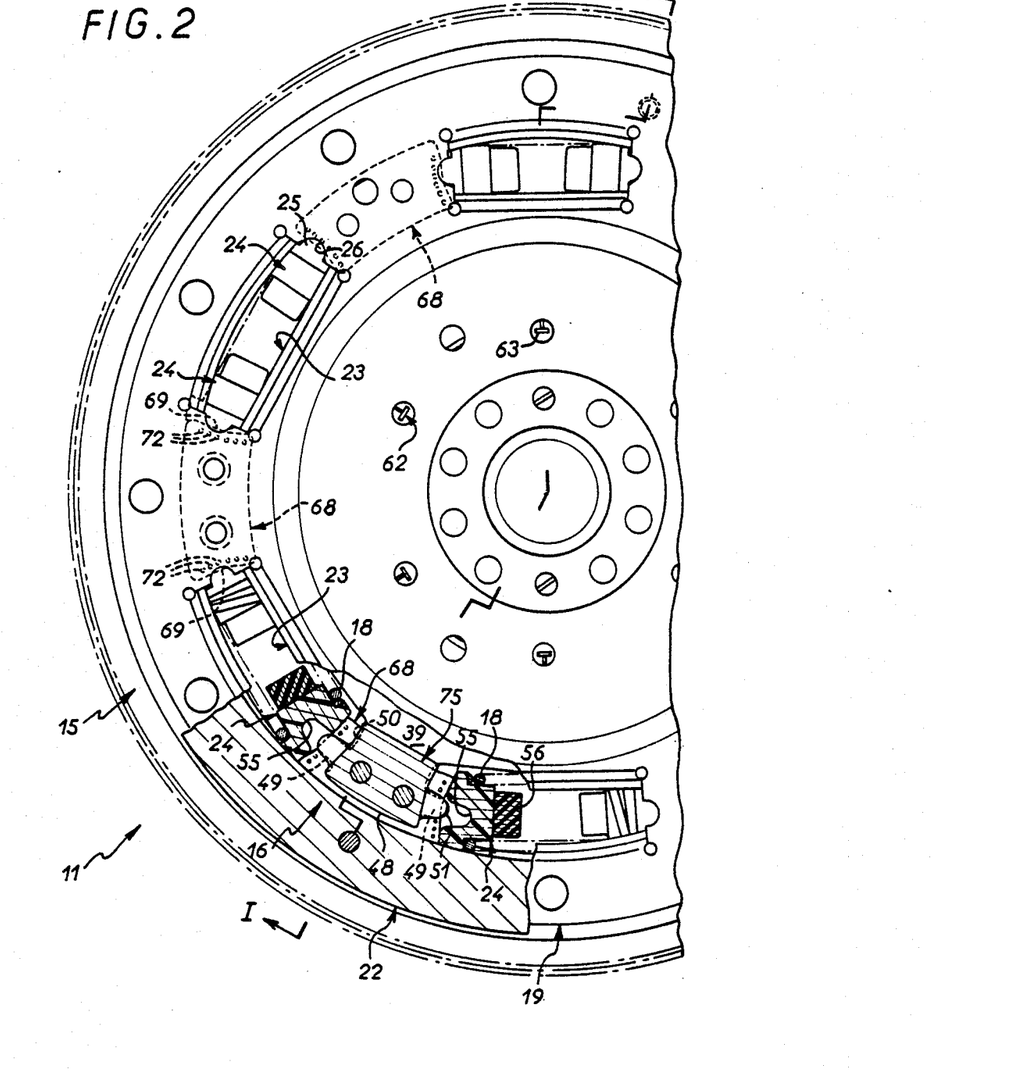
FIG. 2 is a partial cutaway view of the same device, seen in the direction of the arrow II of FIG. 1.

The second part 16 is mounted rotatably on the hub 13 by means of a ball bearing 34 and is composed of an annular piece 35 forming a sort of hub and a plate 36 fastened to the annular piece 35 by means of screws 37. This plate more particularly forms the reaction plate of the clutch, since its outer radial face forms the annular contact surface 12, against which the clutch plate assembly (not shown) is laid.

On the other hand, the annular piece 35 and the plate 36 have respective radial annular bearing surfaces 35a, 36a which are parallel, whilst two parallel webs 38, 39 made of cut-out sheet metal are engaged in the space defined by these two annular bearing surfaces and are pushed axially towards these respectively by axially acting elastic means, two Belleville washers 40, 41 here in this particular case. Here, the bearing surface 35a is formed by means of a collar which extends radially in the direction of the spacer 22 and which belongs to the piece 35 which, moreover, centers the webs 38, 39. Each web carries an annular friction lining 45, by means of which it is in frictional contact with the corresponding radial annular bearing surface. The webs inserted axially between the two flanges 19, 20 are capable of interacting with the pedestals 24 of the springs (in a way which will be described in more detail below), and the arrangement just described constitutes a torque limiter allowing rotary sliding between the first and second coaxial parts, when the transmitted torque exceeds a predetermined value. Each web 38, 39 comprises a flat annular part which carries the linings 45 and which is extended outwards by radial arms 48 (as many as there are springs) secured so as to move circumferentially between the springs. The pedestals therefore have second engagement means interacting with matching engagement means of this second part, in order to define between them at least one second rotary bearing zone. For this purpose, each arm 48 is equipped with two opposing fingers 49 extending substantially in a circumferential direction and projecting respectively from the two substantially radial edges 50 of the arm, these each comprising two portions inclined relative to one another on either side of the corresponding finger 49. Each finger 49 has a rounded end 51 capable of coming in pivoting contact with the rounded bottom of a recess 55 located in the corresponding pedestal and opening out between the two journals mentioned above. Thus, the interaction of the two ends 51 of two parallel fingers belonging respectively to the two webs with the rounded bottom of the recess 55 of a corresponding pedestal defines two second rotary bearing zones, as indicated above. The pedestals are made of molded plastic, but carry blocks of elastomeric material 56 serving as elastic stops in the event of excess torque resulting in excessive compression of the springs.

Of course, the width of the recess 55 is determined as a function of the axial distance between the webs 38, 39 and bearing in mind the wear of the linings 54. More specifically, each pedestal 24 has two plane lateral facets 78 for interaction with the flanges 19, 20. For the sake of convenience, these lateral facets 78 will be called flange stop facets. In practice, the journals 25 each have a cylindrical surface cast in one piece and connected to the corresponding facet 78. Each pedestal 24 likewise has transverse facets 80 for interaction with the webs 38, 39, and for the sake of convenience these facets 80 will be called stop facets for the webs 38, 39. In practice, as can be seen in the figures, the recess 55 opens out substantially at the center of the rear face of the pedestal 24, so that these web stop facets are defined on either side of the recess 55. It will be noted that these facets 80 are inclined relative to one another for interaction with the edges 50. In practice, it is the upper part of the webs 38, 39 which first touches one of the facets 80, in order to disengage the pedestal in operation when the latter occupies a centrifugal position. Between the facets 80, on the one hand, and the facets 79 and journals 25, on the other hand, heels 82 are defined on the rear face of the pedestal 24, and in the embodiment the apical part of the journals is level with the face of the heels, the distance between the two heels corresponding to the width of the recess. As can be seen in the figures, each lateral facet 78 is connected to a heel 82 via a perpendicular guide face designed to interact with the inner face of the flange 19, 20 in question.

As shown in the drawings, the springs do not take effect from the start of the angular movement between the two coaxial parts, since the radial arms must execute a certain angular stroke before some of their fingers engage into the recesses in the corresponding pedestals. Before the fingers engage on the bottom of the pedestals, friction means 60 (themselves taking effect from the start of the angular movement between the two coaxial parts) are provided between the coaxial parts. These friction means are composed of a friction washer 62 and of a Belleville washer 66 forming a spring. The friction washer 62 is immobilized in terms of rotation relative to the first part 15 by axial lugs 63 engaged in holes in the flange 19. It carries a friction lining 64 laid axially against a shoulder 65 of the annular piece 35 of the second part 16. The friction washer is stressed towards the said shoulder by the Belleville washer 66 which bears between this and the flange 19.

The entire arrangement just described up to now is known and was described, for example, in French Pat. No. 2,571,461.

According to the invention, and for the reasons mentioned above, at least one of the coaxial parts and/or the pedestals are equipped with or form elements made of a damping material, for example an elastomeric material, rubber or the like, interposed at least near the above-mentioned engagement means, in order to damp the shocks between the pedestals and the coaxial parts. These damping elements are preferably located at a distance from the rotary bearing zones defined above.

Thus, FIGS. 1 to 5 show a damping device, in which the elements of damping material are mounted on the flanges 19, 20 and between the webs 38, 39, and in this case the pedestals do not necessarily need to be modified.

Figure 3:
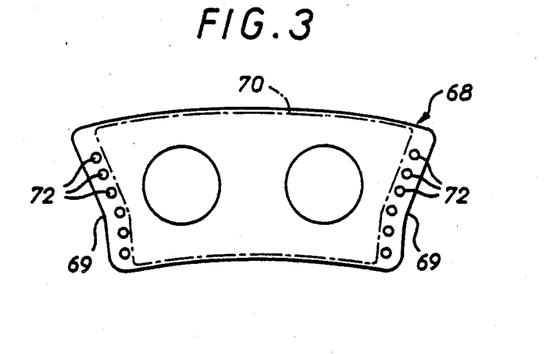
FIG. 3 is a detailed view on a larger scale, showing one of the elements of damping material of the invention associated with a flange or guide washer.

As regards the flanges 19, 20, plates of damping material 68, here elastomeric material, are fastened opposite one another to the inner faces of the latter; they are arranged so as to project circumferentially at 69 relative to the bottoms of the rounded notches 26, at the same time being offset axially relative to these. For the sake of convenience, one and the same plate 68 is provided for the substantially radial edges of two adjacent slots 23 in one and the same flange. Thus, each plate 68 extends between two adjacent slots in one and the same flange and is fastened to this by means of a metal backplate 70, itself set back relative to the edges of the plate of damping material 68 which are adjacent to the rounded notches 26, in such a way that the metal backplates 70 do not come in contact with the pedestals 24. The backplate 70 holding the plate 68 is fastened to the corresponding flange by means of two rivets 71. According to the example, these are located in stampedout receptacles in the backplate. In practice, the thickness of the plate is a function of the width existing between each flange 19, 20 and the webs 38, 39, so that the plate is designed to interact with a heel 82 of the pedestal 24. More specifically, each plate 68 has a circumferential projecting portion at 69 determined so that the projecting portion comes in contact with the heel 82, before the journal 25 interacts with the bottom of the notch 26. According to the example, this projecting portion 69 is shaped to the heel 82 of the pedestal 24. To make it easier for the elastomeric material to move aside and to make it possible, on the one hand, to absorb the variations attributable to the pivoting of the pedestal 24 under load and, on the other hand, to ensure that the journals 25 come in contact with the edges of the notches 26 effectively, the plates of damping material 68 can be perforated with holes 72 extending set back from the substantially radial edges of these, and especially near the corresponding notches 26 in the flange 19 or 20 to which they are fastened.

Figure 4:
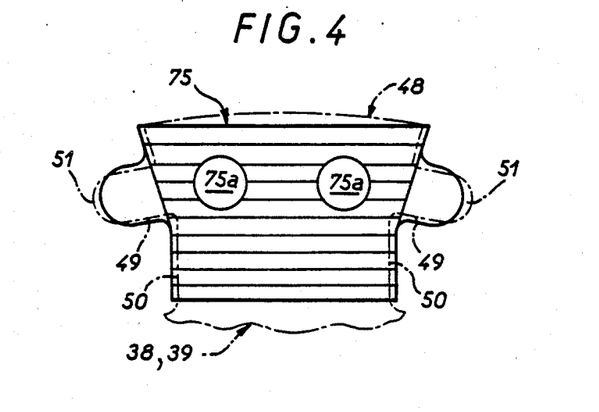
FIG. 4 is a detailed view on a larger scale of another element of damping material associated with webs of one of the above-mentioned coaxial parts.
Figure 5:
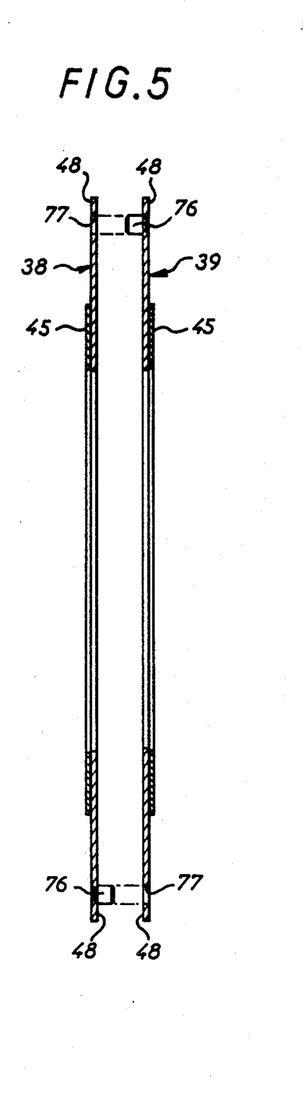
FIG. 5 is a detailed view in diametrical cross-section of these webs, illustrating how they are assembled.

As regards the webs 38, 39, there is a piece of damping material 75 which is relatively flat, but corrugated in its central part in the axial direction. This piece is attached along each radial arm 48 and, more particularly here, is inserted between two such arms opposite one another and belonging to the two webs. As shown in FIG. 4, the piece 75 has a form corresponding substantially to that of a radial arm 48, but it is shaped so as to project relative to the edges of the fingers 49, with the exception of their rounded ends, and/or relative to the substantially radial edges 50 of the arms 48, on either side of the fingers projecting from these radial edges. The central part of the piece 75 is corrugated to allow for the increasing distance between the webs 38, 39 in proportion to the wear of the linings 45 of the assembly forming a torque limiter. Of course, if this torque limiter did not exist, only one web would be needed, and the pieces 75 would then be fastened laterally to this web. According to the example, in which the pieces of damping material are inserted between the radial arms of the two webs, each piece 75 has two holes 75a which are located in its central part and by means of which it is engaged on two corresponding columns 76 riveted or otherwise fastened to one of the webs. These columns slide freely in corresponding holes 77 in the other web, in order to allow some variation in the distance between the webs. They also ensure that the radial arms 48 correspond to one another circumferentially and that they are retained in a good relative position for a correct "engagement" of the pedestals. As shown in FIG. 5, the columns 76 are fastened to one radial arm out of two for each web, the other radial arms having matching holes 77. This makes it possible to produce only a single type of web, two identical webs then being joined together face to face by offsetting them angularly relative to one another, in order to make the columns and the holes correspond. In this exemplary embodiment, the element of damping material 75 is designed to interact with the facets 80, on the one hand, and with the recess 55, on the other hand, and the dimensions of each are such that it comes in contact with the facets 80 or recess 55 before the ends 51 interact with the bottom of the recess 55. Of course, if appropriate, the piece 75 can project relative to the edge of the fingers 49 and, as in the preceding example, have holes 72 to make it easier for the elastomeric material to move aside for the purpose of direct contact between the bottom of the recess 55 and the fingers 49.

The system just described with reference to FIGS. 1 to 5 makes it possible to reduce substantially the transient noises which can occur when the engine stops. In fact, it will be seen that the more or less violent engagement of the fingers 49 in the recesses 55 is damped because contact first takes place laterally with the recess via the parts of damping material which project on each side of the fingers and at the same time or thereafter via the parts of the same piece which project from the substantially radial edges of the arms 48 and which interact with the facets 80, until there is direct contact between the bottom of the recess 55 and the ends 51 of the fingers 49. Moreover, an abrupt restoration of contact of the journals 25 of the pedestals in their notches 26 is damped by the edges of the plates of damping material 68 which project from the bottoms of the notches.

Figure 6:
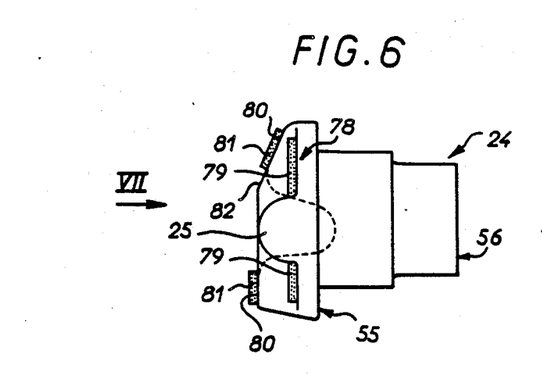
FIG. 6 is a side view of one of the pedestals of the device, equipped with elements of damping material according to the invention.
Figure 7:
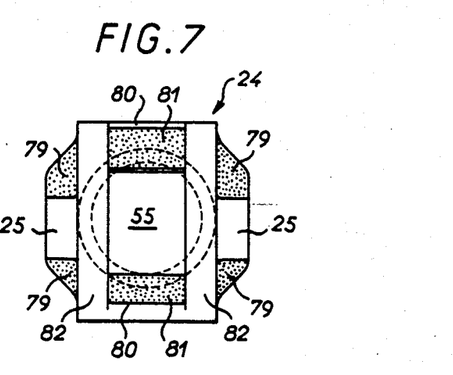
FIG. 7 is a view according to the arrow VII of FIG. 6.

In contrast, it is possible to do without the plates 68 and/or the pieces 75 if the pedestals 24 are modified as illustrated in FIGS. 6 and 7. As emerges more clearly from these figures, the journals 25 each have a cylindrical surface cast in one piece and connected to a plane lateral facet 78. It is therefore possible for this facet to be covered with a layer of damping material 79 extending on either side of the corresponding journal 25. Thus, the layers 79 can, for example, be substituted for the plates of damping material 68. They can also be present together with these plates. Similarly, the recess 55 opens out substantially at the center of the rear face of the pedestal 24, so that facets 80 are likewise defined on either side of the orifice of the recess, these facets being intended to come in contact with the edges 50 of the webs after some pivoting of the pedestals. In another possibility according to the invention, each facet 80 can be covered with a layer of damping material 81. These layers of damping material can be substituted for the elements 75, but the two features can likewise be present together. It is also possible to arrange damping material on the heels 82.

In other words, all the combinations between one or both of the two damping systems described with reference to FIGS. 1 to 5 and one or all of the damping systems described with reference to FIGS. 6 and 7 are possible.

Referring to FIGS. 8 to 12 where the elements of a structure similar to those of the preceding embodiments bear the same reference numerals, these show more particularly an inertia flywheel forming a torsion damper 11 for a motor vehicle transmission, this flywheel having an annular contact surface 12 designed to make it perform the additional function of reaction plate in a friction clutch. In this respect, the flywheel 11 is intended to be fastened by means of its hub 13 to the crankshaft of the internal-combustion engine of the motor vehicle. It comprises two coaxial parts 15 and 16 which will be respectively called the first and the second part below and which are mounted with the possibility of limited rotation relative to one another, in particular counter to the force exerted circumferentially between them by helical springs 18. The first part 15 or driving part, which includes the hub 13, comprises two annular metal flanges 19, 20 commonly called "guide washers". The flange 19 is fastened to the hub 13. The flange 20, parallel to the flange 19, is fastened on the outside of the latter, with a solid annular spacer 22 carrying the starting ring being interposed. These flanges have in the conventional way elongate slots 23 extending circumferentially. Each slot in one flange is opposite a symmetrical slot in the other flange, so as to define receptacles intended for containing the springs 18. Each spring 18 is mounted in such a receptacle by means of two end pedestals 24.

Figure 8:
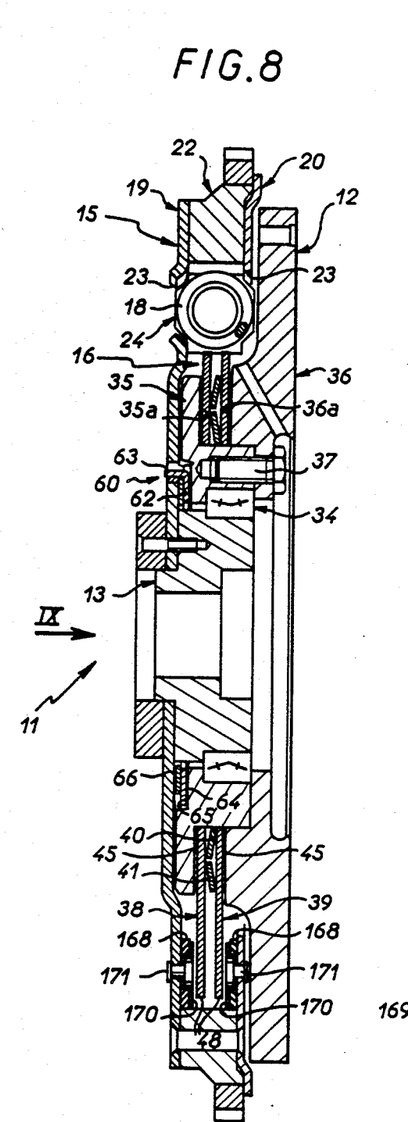
FIG. 8 is a general view of a torsion-damping device forming an inertia flywheel, incorporating the last improvement mentioned and illustrated along the sectional line VIII-VIII of FIG. 9.
Figure 9:
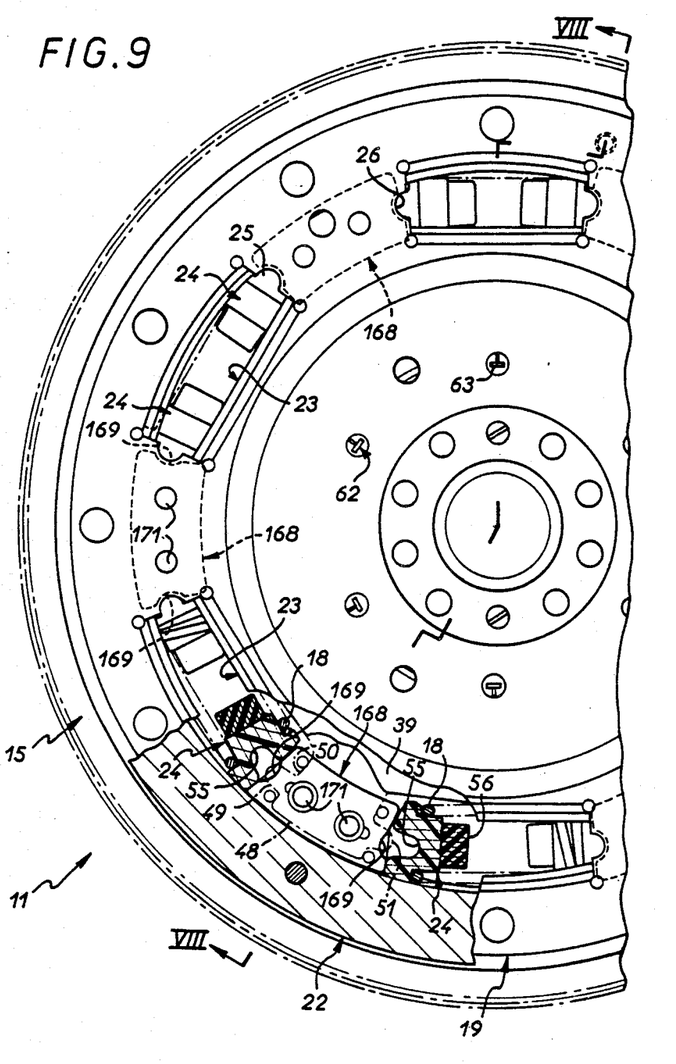
FIG. 9 is a partial cutaway view of the same device, seen in the direction of the arrow IX of FIG. 8.

In the example described, each pedestal has two lateral journals 25 providing a common axle parallel to the axis of rotation of the damping flywheel, whilst the slots 23 have, on their substantially radial edges, rounded notches 26 receiving the journals 25 of the corresponding pedestal. Also in practice, the center of each end of the spring 18 is positioned nearer to the axis of rotation than the center of rotation of the convex part 25 forming a journal.

The second part 16 is mounted rotatably on the hub 13 by means of a ball bearing 34 and is composed of an annular piece 35 forming a sort of hub and a plate 36 fastened to the annular piece 35 by means of screws 37.

This plate more particularly constitutes the reaction plate of the clutch, since its outer radial face forms the annular contact surface 12, against which the clutch plate assembly (not shown) is laid.

On the other hand, the annular piece 35 and the plate 36 have respective radial annular bearing surfaces 35a, 36a which are parallel, whilst two parallel webs 38, 39 made of cut-out sheet metal are engaged in the space defined by these two annular bearing surfaces and are pushed axially towards these respectively by axially acting elastic means, two Belleville washers 40, 41 here in this particular case. Here, the bearing surface 35a is formed by means of a collar which extends radially in the direction of the spacer 22 and which belongs to the piece 35 which, moreover, centers the webs 38, 39. Each web carries an annular friction lining 45, by means of which it is in frictional contact with the corresponding radial annular bearing surface. The webs inserted axially between the two flanges 19, 20 are capable of interacting with the pedestals 24 of the springs (in a way which will be described in more detail below), and the arrangement just described forms a torque limiter allowing rotary sliding between the first and second coaxial parts when the transmitted torque exceeds a predetermined value. Each web 38, 39 comprises a flat annular part carrying the linings 48 and extended outwards by radial arms 48 (as many as there are springs) secured so as to move circumferentially between the springs. For this purpose, each arm 48 is equipped with two opposing fingers 49 extending substantially in a circumferential direction and respectively projecting from the two substantially radial edges of the arm. Each finger 49 has a rounded end 51 capable of coming in pivoting contact with the rounded bottom of a recess 55 located in the corresponding pedestal and opening out between the two journals mentioned above. The pedestals are made of molded plastic, but carry blocks of elastomeric material 56 serving as elastic stops in the event of excess torques resulting in excessive compression of the springs.

Of course, the width of the recess 55 is determined as a function of the axial distance between the webs 38, 39 and bearing in mind the wear of the linings 54. More specifically, each pedestal 24 has two plane lateral facets 78 for interacting with the flanges 19, 20. For the sake of convenience, these lateral facets 78 will be called flange stop facets. In practice, each journal 25 has a cylindrical surface cast in one piece and connected to the corresponding facet 78. Each pedestal 24 likewise has transverse facets 80 for interaction with the webs 38, 39, and for the sake of convenience these facets 80 will be called web stop facets. In practice, as can be seen in the Figures, the recess 55 opens out substantially at the center of the rear face of the pedestal 24, so that these web stop facets are defined on either side of the recess 55. It will be noted that these facets 80 are inclined relative to one another for interaction with the edges 50. In practice, it is the upper part of the webs 38, 39 which first touches one of the facets 80 in order to disengage the pedestal in operation when the latter occupies a centrifugal position. Between the facets 80, on the one hand, and the facets 78 and the journals 25, on the other hand, heels 82 are defined on the rear face of the pedestal 24. The distance between the two heels corresponds to the width of the recess. The shape of these heels is one of the characteristics of the invention and will be described later. As can be seen in the figures, each lateral facet 78 is connected to a heel 82 via a perpendicular guide face designed to interact with the inner face of the flange 19, 20 in question.

The springs do not take effect from the start of the angular movement between the two coaxial parts, since the radial arms must execute a certain angular stroke before some of their fingers engage into the recesses in the corresponding pedestals. Friction means 60 (themselves taking effect from the start of the angular movement between the two coaxial parts) are provided between the coaxial parts. These friction means are composed of a friction washer 62 and of a Belleville washer 66 forming a spring. The friction washer 62 is immobilized in terms of rotation relative to the first part 15 by axial lugs 63 engaged in holes in the flange 19. It carries a friction lining 64 laid axially against a shoulder 65 of the annular piece 35 of the second part 16. The friction washer is stressed towards the shoulder by the Belleville washer 66 bearing between this and the flange 19.

The flanges 19, 20 carry elements made of a damping material, for example an elastomeric material, rubber or the like.

Figure 10:
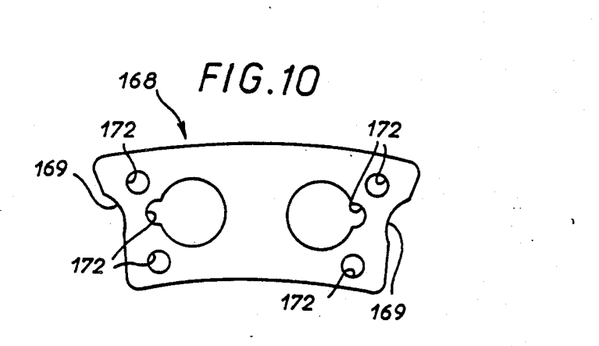
FIG. 10 is a detailed view of an element of damping material on a larger scale.

In the example illustrated here, there are plates of damping material 168 fastened to the inner faces of the flanges opposite one another. For the sake of convenience, a single plate 168 is provided for the substantially radial edges of two adjacent slots 23 in one and the same flange. Thus, each plate 168 extends between two adjacent slots of one and the same flange and is fastened to this by means of a metal backplate 170, itself set back relative to the edges of the plate of damping material 168 which are adjacent to the rounded notches 26, so that the metal backplates 170 do not come in contact with the pedestals 24. The backplate 170 holding the plate 168 is fastened to the corresponding flange by means of two rivets 171. According to the example, these are located in stamped-out receptacles in the backplate. In practice, the thickness of the plate is a function of the width existing between each flange 19, 20 and the webs 38, 39, so that the plate is designed to interact with a heel 82 of the pedestal 24. The circumferential width of the plate is such that it comes in contact with the heel 82 of the pedestal 24, before the journals 25 actually come in contact with the notches 26. To make it easier for the elastomeric material to move aside and to allow the journals 25 actually to come in contact with the edges of the notches 26, each plate 168 is perforated with holes 172 extending set back from the substantially radial edges of the latter. According to the example, there is only a limited number (three) of these holes and they are of relatively large diameter. One of them opens into the adjacent fastening hole in the plate.

Figure 11:
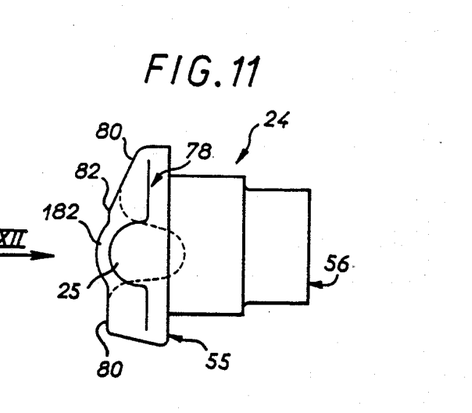
FIG. 11 is a side view of one of the pedestals of the device.
Figure 12:
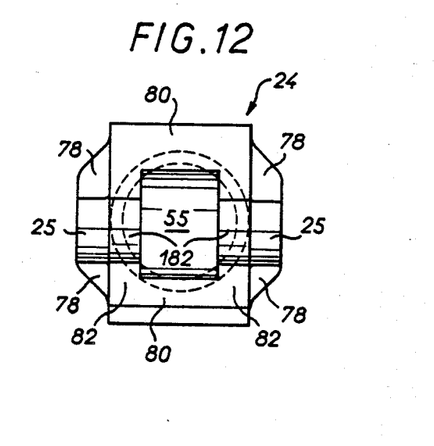
FIG. 12 is a view according to the arrow XII of FIG. 11.

The elements of damping material (that is to say, the plates 168) and the zones of the rear face of each pedestal (that is to say, the heels 82) which are capable of coming in contact with one another are provided with interacting cut-outs and reliefs, making it possible to stabilize each pedestal radially relative to the flanges 19, 20 during a transient relative circumferential movement between the pedestal and the two flanges as a whole. More specifically, each relief mentioned above consists of a prominence 182 which has a substantially cylindrical outer surface and which projects from the rear face of the pedestal, and more specifically from a heel 82 of the pedestal. Thus, the cylindrical surface is substantially coaxial relative to that of the adjacent journal 25. Moreover, the cut-out 169 which each plate 168 has at each of its ends has the form of an arc of a circle substantially matching the corresponding prominence 182.

By means of this arrangement, during a circumferential return movement of the pedestal towards the corresponding edges of the flanges, the first contact zone forms between the two prominences 182 and the edges of the corresponding cut-outs 169, thus ensuring good circumferential "guidance", despite the fact that the forces exerted by the corresponding spring 18 are relatively low. This guidance is sufficient to prevent the pedestal from being offset radially outwards under the effect of the centrifugal force.

What we claim is:

1. A torsion-damping device, particularly for a clutch said torsion damping device comprising two coaxial parts mounted for limited rotation relative to each other, a first of said coaxial parts comprising two substantially parallel annular flanges and a second of said coaxial parts comprising at least one web arranged axially between said flanges, and parts of pedestals mounted on one of the parts, springs arranged substantially circumferentially between said pedestals, each of said pedestals having first engagement means cooperable with matching engagement means on one of said coaxial parts to define therebetween at least one first rotary bearing zone, and second engagement means cooperable with matching engagement means on the other of said coaxial parts to define therebetween at least one second rotary bearing zone, at least one of said coaxial parts and pedestals having damping means of elastic material disposed proximate to said engagement means for damping impacts between said pedestals and said coaxial parts.

2. The damping device as claimed in claim 1, wherein said damping means are spaced from said rotary bearing zones.

3. The damping device as claimed in claim 1, wherein said damping means are carried by said flanges.

4. The torsion-damping device as claimed in claim 3, wherein said flanges have elongate slots arranged circumferentially, two aligned slots being provided respectively in said flanges receiving one of said springs preloaded between a corresponding pair of said pedestals, each of said slots having, on substantially radial edges, rounded notches receiving journals defined on corresponding ones of said pedestals, said damping means and zones of rear face of each of said pedestals adapted to come into contact with one another are respectively provided with cut-outs and relief portions mutually cooperable to stabilize said pedestals radially relative to said flanges during relative circumferential movement therebetween.

5. The torsion-damping device as claimed in claim 4, wherein each of said relief portions of each of said pedestals comprises a protrusion having a substantially cylindrical outer surface projecting from the rear face of said pedestal, said substantially cylindrical surface being coaxial relative to that of the corresponding journal and located proximate thereto, said damping means having said cut-outs substantially matching the configuration of said protuberance.

6. The damping device as claimed in claim 1, wherein said damping means are attached to said flanges and are designed to interact with rear faces of said pedestals remote from said springs.

7. The damping device as claimed in claim 6, wherein said flanges have elongate slots arranged circumferentially, pairs of aligned slots provided in said flanges receiving respective ones of said springs, said slots having substantially radial edges with rounded notches for receiving journals defined on corresponding ones of said pedestals, said damping means comprising plates of damping material fastened to axially inner faces of said flanges and projecting circumferentially relative to bottom ends of said rounded notches.

8. The damping device as claimed in claim 7, wherein each of said plates of damping material extends between adjacent radial edges of two adjacent ones of said slots in one of said flanges and is fastened thereto by means of a metal backplate circumferentially set back relative to the edges of said plate of damping material which are adjacent to said rounded notches.

9. The damping device as claimed in claim 7, wherein one of said plates of damping material is perforated with holes located near the corresponding notch or notches in the flange to which it is fastened.

10. The damping device as claimed in claim 1, wherein said damping means are attached to said web and are designed to interact with rear faces of said pedestals, remote from said springs.

11. The damping device as claimed in claim 10, wherein said web has radial arms each equipped with two opposing fingers extending substantially circumferentially, each of said fingers having a rounded end for rocking contact with a round end recess in a corresponding one of said pedestals, damping means being attached to said web and being cooperable with the recesses in the corresponding pedestals.

12. The damping device as claimed in claim 11, wherein said damping means includes at least one relatively flat piece of damping material attached along one said radial arm, and shaped and arranged so as to project beyond selected one of (i) edges of said fingers other than said recess round ends, and (ii) said substantially radial edges of said one radial arm, on either side of said fingers.

13. The damping device as claimed in claim 12, wherein there are two said webs parallel to each other, elastic means between said webs to urge said webs respectively toward bearing surfaces on said second part, with friction linings optionally interposed therebetween, thereby defining a torque limiter, pairs of radial arms of the respective webs being in registration, said pieces of damping material being disposed between said pair of radial arms.

14. The damping device as claimed in claim 13, wherein each of said pieces of damping material has a form corresponding substantially to that of the corresponding radial arms, and a corrugated central portion.

15. The damping device as claimed in claim 14, wherein each of said pieces of damping material has two holes in its central portion and is engaged by means of these two holes on two pins connecting the corresponding pair of radial arms together, said arms also ensuring circumferential registration of said radial arms of said webs.

16. The damping device as claimed in claim 11, wherein said damping means includes a relatively flat piece of damping material shaped and arranged so as to project beyond edges of said fingers.

17. The damping device as claimed in claim 1, wherein each of said pedestals has two lateral journals defining a common axis and cooperable with corresponding notches in said flanges, each of said journals having a cylindrical surface formed in one piece and connected to a lateral facet, said damping means including a layer of damping material covering said facet on both sides of the corresponding journal.

18. The damping device as claimed in claim 1, wherein each of said pedestals has a recess opening out circumferentially away from the corresponding spring and designed to receive at least one finger defined on said web and extending substantially circumferentially, wherein facets extending on both sides of a mouth of the recess and adapted to come in contact with substantially radial edges of said web are covered with a layer of damping material, said damping means comprising said layer of damping material.

19. The damping device as claimed in claim 1, comprises an inertia flywheel forming a reaction plate of a friction clutch.

20. The damping device as claimed in claim 1, wherein said damping means are carried by said web.

21. The damping device a claimed in claim 1, wherein said damping means are carried by said pedestals.

22. The damping device according to claim 1, wherein said elastic material is elastomeric material.

* * * * *